July 29, 1947. E. C. HARTLEY 2,424,822
EXCAVATOR
Filed April 7, 1945
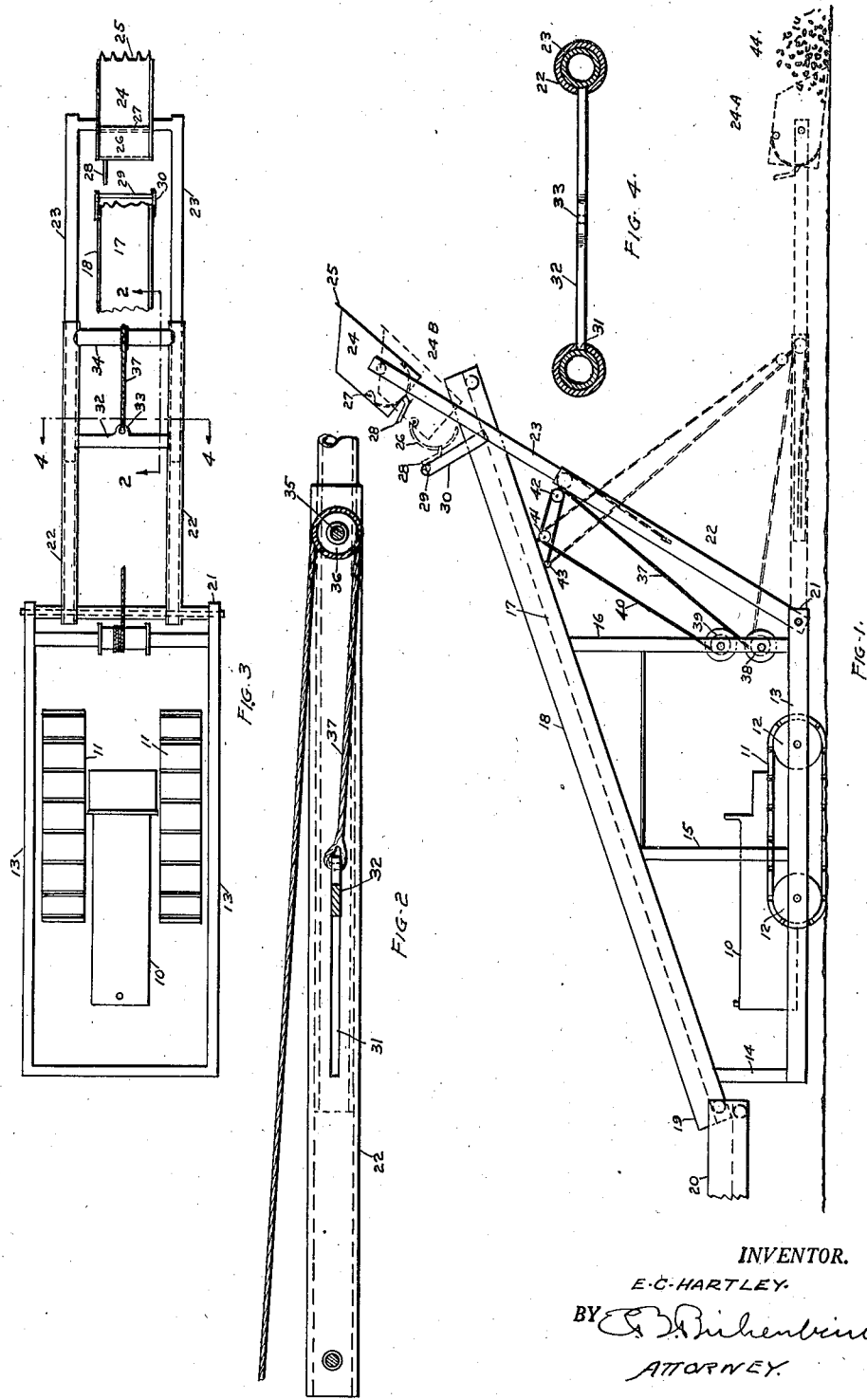
INVENTOR.
E. C. HARTLEY.
BY
ATTORNEY.

Patented July 29, 1947

2,424,822

UNITED STATES PATENT OFFICE 2,424,822

EXCAVATOR

Elvin C. Hartley, Portland, Oreg.

Application April 7, 1945, Serial No. 587,131

4 Claims. (Cl. 214—91)

This invention relates generally to earth handling machinery and particularly to an excavator.

The main object of this invention is to provide an exceedingly simple and efficient form of excavator wherein earth or materials may be picked up and lifted to a desired height and dumped into a conveyor from whence it may be carried into a vehicle or grizzly as the case may be.

The second object is to provide a device of the class described which will be flexible in operation and have a maximum amount of capacity for a given weight of machinery.

I accomplish these and other objects in the manner set forth in the following specification, as illustrated in the accompanying drawing, in which:

Fig. 1 is a side elevation of the device showing the digging bucket in various positions.

Fig. 2 is an enlarged section taken along the line 2—2 in Fig. 3.

Fig. 3 is a plan of Fig. 1 with parts of the conveyor broken away to expose the parts.

Fig. 4 is a section taken along the line 4—4 in Fig. 3.

Similar numerals refer to similar parts throughout the several views.

Referring in detail to the drawing there is shown a common form of track laying tractor 10 whose endless track 11 passes around the wheels 12 which support the horizontal frame 13 upon whose posts 14, 15 and 16 are supported the conveyor belt 17 which operates between the side walls 18 whose lower ends 19 are illustrated as extending over the top of a second conveyor 20. It will be understood that the member 20 may be a vehicle, a grizzly, a conveyor, a bin, or merely a dumping point.

The forward end 21 of the frame 13 has mounted thereon a pair of tubular arms 22 into which telescope the tubes 23 between which are tiltably mounted the bucket 24 having a digging edge 25 preferably serrated, and having a curved gate 26 hinged on the pivot points 27 along the top thereof. The bucket 26 is provided with a trip arm 28 which can engage the transverse rod 29 mounted on the stationary arms 30 which are secured to the side wall 18.

In Fig. 4 it can be seen that the tubes 22 are provided with slots 31 through which extend the transverse bar 32 having an eye 33 at the middle thereof. The ends of the bar 32 are secured to the tubes 23. Secured between the outer ends of the members 22 are the transverse tubes 34 through which extends the shaft 35 on which is mounted a sheave 36. A line 37 is secured to the eye 33 and passes around the sheave 36 and thence to a cable winding drum 38 which is supported between the posts 16.

A second cable winding drum 39 has secured thereon a cable 40 which passes over the sheave 41 secured to the conveyor side walls 18, thence around a block 42 secured to the upper end of the arms 22, thence to a point of fastening 43 along the under edge of the side walls 18.

A suitable power means (not shown) drives the drums 38 and 39 but the use is so well known that it will not be explained in detail here.

The operation of the device is as follows:

Assuming that it is desired to deposit the dirt 44 in the member 20, the operator of the tractor 10 lowers the boom stick composed of the tubes 22 and 23 by the proper operation of the drum 39, until it reaches the position shown as 24—A in Fig. 1, and then by moving the tractor along the ground he is able to fill the bucket 24. The operator then rotates the drum 38 which causes the line 40 to move the bar 32 pushing the shovel into the pile of dirt 44.

He then raises the arms 23 by manipulating the line 37 causing the bucket 24 to assume the position shown in full lines in Fig. 1, then by slacking away on the drum 38 the bucket 24 is allowed to descend to the position shown in dotted lines as 24—B. Such a descent allows the trip arm 28 to engage the bar 29 and open the gate 26 and allow the contents of the bucket 24—B to descend upon the conveyor belt 17 by means of which it is carried to the member 20.

It must be understood that the present illustration is only by way of example, and that the general arrangement can be modified considerably without departing from the spirit of my invention.

I claim:

1. In an excavator, the combination of a land travelling vehicle having a telescopic boom at one end thereof and having a tiltable excavator bucket mounted on the outer edge of said boom, said bucket having a trip gate at its rearmost end, a conveyor disposed over said vehicle in the plane of movement of said boom, means for raising and lowering said boom in the plane of said conveyor, and means for extending said telescopic boom in a manner to move said bucket away from said land travelling vehicle.

2. In an excavator of the class described, the combination of a land travelling vehicle having a frame mounted thereon, a conveyor supported by said frame, a telescopic boom mounted on said frame adapted to straddle said conveyor, the outer end of said boom having a shovel mounted thereon, said shovel having a trip gate at the rearmost end thereof, a bar supported by said conveyor in the path of said bucket, means for raising and lowering said boom in the plane of said conveyor, and means for extending said boom in a manner to move said bucket away from the foot of the boom, said bucket being moved in the direction of said vehicle by gravity or by driving said vehicle.

3. In an excavator of the class described, the combination of a land travelling vehicle having a pair of spaced telescopic members hinged at one end of said vehicle and having a shovel therebetween at the opposite end of said boom, the portions of said boom nearest the vehicle having longitudinal slots formed therein in their adjacent sides, a bar extending through said slots and attached to the portions of the telescopic member inside of the slotted members, a line attached to said bar and passing around said sheave, and a cable winding mechanism attached to said line whereby a winding movement thereof will extend said telescopic movement toward a greater length.

4. An excavator of the class described, a combination of a vehicle, an inclined conveyor supported by said vehicle in its plane of travel, a telescopic boom hinged at one end to the vehicle including means for extending same and having two portions which pass along opposite sides of said conveyor when the boom is raised, the swinging ends of said boom having a bucket mounted therebetween, the rearmost ends of said bucket having a trip gate which is normally closed, and means for tripping said gate when said bucket is in an elevated position above said conveyor.

ELVIN C. HARTLEY.

REFERENCES CITED

The following references are of record in the file of this patent:

UNITED STATES PATENTS

| Number | Name | Date |
|---|---|---|
| 388,910 | Osgood | Sept. 4, 1888 |
| 1,293,447 | Huhn | Feb. 4, 1919 |
| 1,366,201 | Mayne | Jan. 18, 1921 |
| 1,425,399 | Loftsgaarden | Aug. 8, 1922 |
| 1,539,099 | Sullivan | May 26, 1925 |
| 2,086,687 | Whitmire | July 13, 1937 |
| 2,254,464 | Wheeler | Sept. 2, 1941 |
| 2,366,480 | Beckwith | Jan. 2, 1945 |